(12) United States Patent
Taylor et al.

(10) Patent No.: US 9,982,515 B2
(45) Date of Patent: May 29, 2018

(54) FUSIBLE, RESETTABLE LOCK OPEN DEVICE

(71) Applicant: GE Oil & Gas Pressure Control LP, Houston, TX (US)

(72) Inventors: Carl Raymond Taylor, Shawnee, OK (US); Keith Adams, Katy, TX (US); Travis Kyle McEvoy, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 324 days.

(21) Appl. No.: 14/747,644

(22) Filed: Jun. 23, 2015

(65) Prior Publication Data
US 2015/0376986 A1    Dec. 31, 2015

Related U.S. Application Data

(60) Provisional application No. 62/017,009, filed on Jun. 25, 2014, provisional application No. 62/137,418, filed on Mar. 24, 2015.

(51) Int. Cl.
*F16K 17/40* (2006.01)
*E21B 41/00* (2006.01)
(Continued)

(52) U.S. Cl.
CPC ............ *E21B 41/00* (2013.01); *E21B 23/02* (2013.01); *E21B 34/02* (2013.01); *F16K 3/0254* (2013.01);
(Continued)

(58) Field of Classification Search
CPC ......... E21B 41/00; E21B 23/02; E21B 34/02; F16K 17/383; F16K 3/0254; F16K 31/122; F16K 31/56; F16K 35/04
(Continued)

(56) References Cited

U.S. PATENT DOCUMENTS

| 422,583 | A | * | 3/1890 | Finch et al. | ......... F16K 17/383 137/75 |
| 2,638,106 | A | * | 5/1953 | Shiels | ......... F16K 17/383 137/75 |

(Continued)

OTHER PUBLICATIONS

International Search Report and Written Opinion issued in connection with corresponding PCT Application No. PCT/US2015/037363 dated Sep. 22, 2015.

*Primary Examiner* — Minh Le
(74) *Attorney, Agent, or Firm* — Hogan Lovwells US LLP (57) ABSTRACT

A locking apparatus for attaching to an end of a valve actuator includes an assembly body, the assembly body releasably securable to a valve actuator. The assembly body has a stem bore for receiving an actuator stem, and a plunger orifice through a sidewall of the assembly body. An immobilizer assembly has a plunger extending through the plunger orifice, and biased radially outward and moveable between a radially inner position where the immobilizer assembly extends over the stem bore, and a radially outer position where an inner end of the immobilizer assembly is radially outward of the stem bore. A segmented housing circumscribes the assembly body and is moveable between a first position where the plunger is in the radially outer position and a second position where the plunger is in the radially inner position. A fusible band selectively retains the segmented housing in engagement with the immobilizer assembly.

21 Claims, 7 Drawing Sheets

(51) Int. Cl.
  *E21B 34/02*    (2006.01)
  *F16K 35/04*    (2006.01)
  *F16K 31/122*   (2006.01)
  *F16K 31/56*    (2006.01)
  *F16K 3/02*     (2006.01)
  *F16K 17/38*    (2006.01)
  *E21B 23/02*    (2006.01)

(52) U.S. Cl.
  CPC .......... *F16K 17/383* (2013.01); *F16K 31/122* (2013.01); *F16K 31/56* (2013.01); *F16K 35/04* (2013.01)

(58) Field of Classification Search
  USPC ............ 137/72, 75, 77; 251/90, 113, 93, 14, 251/636, 297, 330
  See application file for complete search history.

(56) References Cited

U.S. PATENT DOCUMENTS

| | | | | |
|---|---|---|---|---|
| 2,956,574 A * | 10/1960 | Cowan | ................ | F16K 17/383 137/270 |
| 3,659,624 A | 5/1972 | Kelly et al. | | |
| 3,788,600 A * | 1/1974 | Allen | ................ | F16K 3/316 137/74 |
| 3,838,705 A | 10/1974 | Diehl et al. | | |
| 3,842,853 A | 10/1974 | Kelly et al. | | |
| 3,842,854 A * | 10/1974 | Wicke | ................ | F16K 17/383 137/77 |
| 3,896,835 A * | 7/1975 | Wicke | ................ | F16K 17/383 137/72 |
| 4,193,416 A * | 3/1980 | Slawson | ................ | F16K 17/383 137/72 |
| 4,240,455 A | 12/1980 | McGee | | |
| 4,245,662 A * | 1/1981 | McGee | ................ | F16K 17/383 137/553 |
| 4,421,134 A * | 12/1983 | Bruton | ................ | F16K 3/0209 137/72 |
| 4,796,860 A * | 1/1989 | Diel | ................ | F16K 11/0704 251/297 |
| 4,827,963 A | 5/1989 | Baker et al. | | |
| 4,890,635 A * | 1/1990 | Gray, Jr. | ................ | A62C 2/04 137/75 |
| 5,067,510 A | 11/1991 | Breaux et al. | | |
| 5,275,194 A * | 1/1994 | Gray, Jr. | ................ | A62C 2/04 137/75 |
| 7,150,287 B2 * | 12/2006 | Kita | ................ | F16K 17/383 137/72 |
| 8,550,105 B2 * | 10/2013 | Ishitoya | ................ | F16K 1/307 137/72 |
| 8,726,923 B2 * | 5/2014 | Daido | ................ | F16K 17/383 137/72 |
| 8,985,552 B2 * | 3/2015 | Udipi | ................ | F16K 3/0254 137/384.2 |
| 2014/0138082 A1 * | 5/2014 | Meyberg | ................ | E21B 34/02 166/97.1 |

* cited by examiner

FUSIBLE, RESETTABLE LOCK OPEN DEVICE

CROSS REFERENCE TO RELATED APPLICATIONS

This application claims priority to and the benefit of: U.S. Provisional Application Ser. No. 62/017,009 filed Jun. 25, 2014, titled "Fusible, Resettable Lock Open Device;" and U.S. Provisional Application Ser. No. 62/137,418 filed Mar. 24, 2015, titled "Fusible, Resettable Lock Open Device," the full disclosure of both of which is hereby incorporated herein by reference in its entirety for all purposes.

BACKGROUND

1. Field of Disclosure

This invention relates in general to valve actuating devices, and in particular to methods and systems for locking a valve actuator in an extended position.

2. Description of Related Art

Valves with linear acting stems are commonly used in hydrocarbon drilling and production operations. For actuators used with these valves, a biasing spring often is used to return the valve to a normal position. In some such valves, a pressure media is used in the actuator to move the valve between a normal or contracted, unpressurized position, and an actuated or extended position. The pressure of the pressure media engages a piston to overcome the biasing spring and maintain the valve in the extended position. However, such pressure must be maintained for the valve to remain in the extended position. An unintentional loss of the pressure can cause the valve to return to the normal position, interfering with ongoing operations.

Valves can be locked in an actuated position. However, in the event of a well fire or other high heat and potential dangerous condition, it might be desirable for the valve to return to the normal position. As an example, it can be desirable for the valve to return to the normal position if the normal position will close the valve to reduce environmental and safety risks.

SUMMARY OF THE DISCLOSURE

Embodiments of the current disclosure provide systems and methods that are capable of locking an actuator by restricting movement of an actuator stem when intended, and also unlocking the actuator by allowing movement of the actuator stem when intended. In the event of raised temperatures a fusible band can deteriorate, allowing the valve actuator to move the valve to the normal position, such as the closed position for normally closed valves. After the fusible band deteriorates, the locking apparatus can be reset with a new fusible band and reused. Embodiments of this application provide the ability to lock and unlock a valve actuator remotely or manually while also having resettable fire safe features.

In an embodiment of this disclosure a locking apparatus for attaching to an end of a valve actuator is disclosed. The locking apparatus includes an assembly body, the assembly body releasably securable to a valve actuator. The assembly body has a stem bore for receiving an actuator stem, and a plunger orifice through a sidewall of the assembly body. An immobilizer assembly has a plunger extending through the plunger orifice, the plunger being biased radially outward and moveable between a radially inner position where the immobilizer assembly extends over the stem bore, and a radially outer position where a portion of an inner end of the immobilizer assembly is radially outward of the stem bore. A segmented housing circumscribes the assembly body and is moveable between a first position where the plunger is in the radially outer position and a second position where the plunger is in the radially inner position. A fusible band selectively retains the segmented housing in engagement with the immobilizer assembly.

In another embodiment of this disclosure, a locking apparatus for attaching to an end of a valve actuator includes an assembly body, the assembly body releasably securable to a valve actuator. The assembly body has a stem bore for receiving an actuator stem, and a plunger orifice through a sidewall of the assembly body. A plurality of immobilizer assemblies are spaced circumferentially around the assembly body, each of the plurality of immobilizer assemblies having a plunger extending through the plunger orifice. The plunger is moveable between a radially inner position where a portion of the inner end of each immobilizer assembly extends over the stem bore, and a radially outer position where the portion of the inner end of each immobilizer assembly is radially outward of the stem bore. At least two ring shaped housing segments have an assembled condition where the housing segments form a segmented housing that circumscribes the assembly body and engages an outer end of each immobilizer assembly. A fusible band selectively retains the housing segments in the assembled condition.

In yet another embodiment of this disclosure, a method for locking a valve with a locking apparatus attached to an end of a valve actuator includes providing an assembly body and releasably securing the assembly body to a valve actuator. The assembly body has a stem bore for receiving an actuator stem, and a plunger orifice through a sidewall of the assembly body. A plunger of an immobilizer assembly is moved through the plunger orifice from a radially outer position where a portion of an inner end of the immobilizer assembly is radially outward of the stem bore, to a radially inner position where the portion of inner end of the immobilizer assembly extends over the stem bore and prevents the actuator stem from extending past the immobilizer assembly. The plunger is retained in the radially inner position with a segmented housing that circumscribes the assembly body. The segmented housing is retained in engagement with the immobilizer assembly with a fusible band.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE DISCLOSURE

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
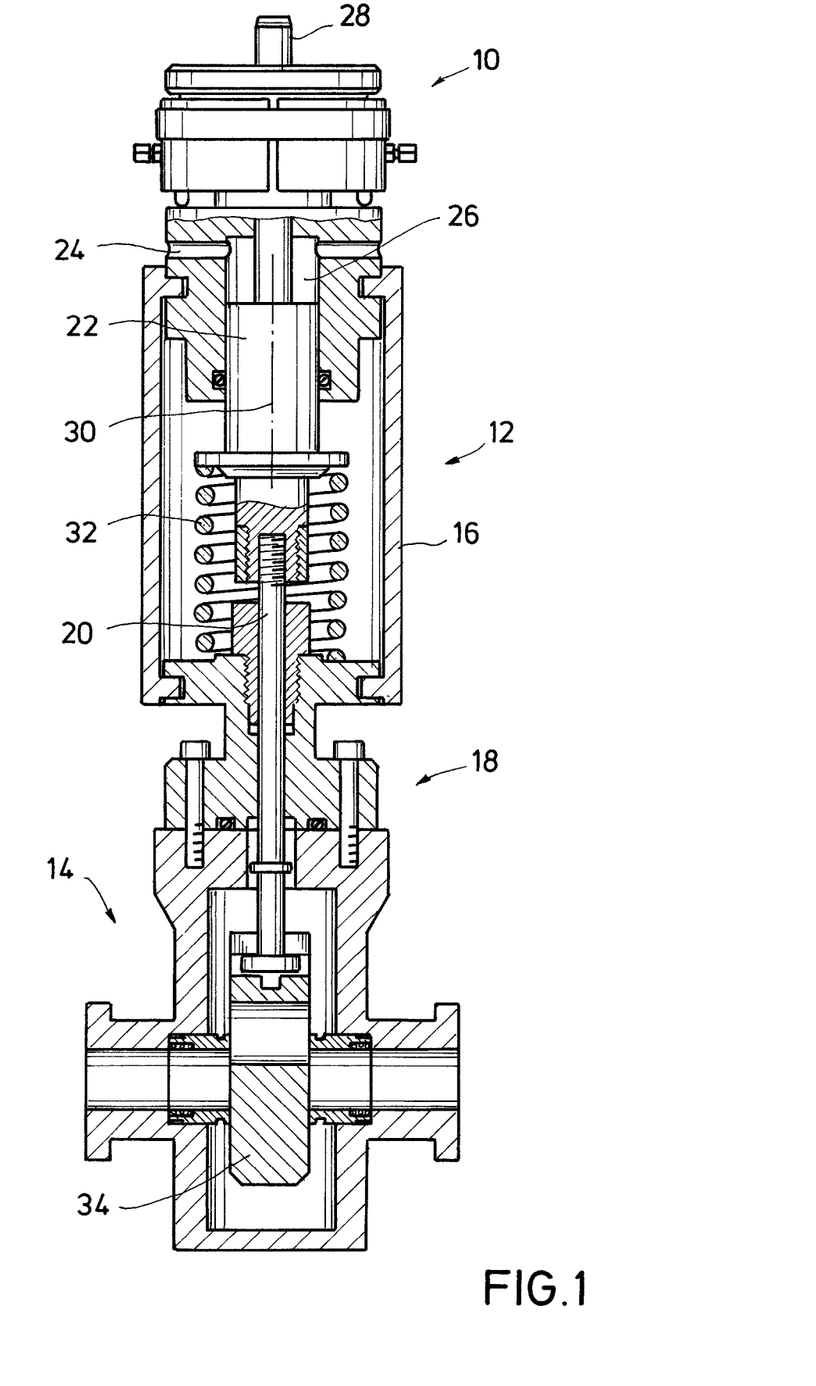
FIG. 1 is a section view of a valve assembly with a locking apparatus in accordance with an embodiment of this disclosure.

Looking at FIG. 1, an example of a locking apparatus 10 is attached to an end of valve actuator 12. In the embodiment of FIG. 1, valve actuator 12 is a hydraulic piston type actuator for actuating valve 14. Valve actuator 12 includes actuator housing 16, which is connected to bonnet 18. Valve stem 20 extends downward through actuator housing 16 and actuates valve 14. Actuator piston 22, which is substantially cylindrical, coaxially mounts within actuator housing 16. Actuator ports 24 are used to introduce pressurized media into actuator piston chamber 26, or for releasing media from actuator piston chamber 26.

Actuator stem 28 extends upward extends axially out of actuator housing 16. Actuator piston 22 has a lower end that is secured to valve stem 20 so that movement of actuator piston 22 and actuator stem 28 along central axis 30 results in axial movement of valve stem 20. Actuator stem 28 and valve stem 20 are co-axial and therefore share central axis 30. Spring 32 urges actuator piston 22 in a direction away from valve 14. As actuator piston 22 moves towards valve 14, valve stem 20 and gate 34 of valve 14 move from an upper, to a lower. In the embodiment of FIG. 1 valve 14 is closed in the upper position and is open in the lower position. In such an embodiment, locking apparatus 10 will work as a lock open device. In alternate embodiments valve 14 is open in the upper position and is closed in the lower position and locking apparatus 10 can work as a lock closed device.

Although valve actuator 12 is shown and described herein as a hydraulic piston type actuator, and valve 14 is described as a gate valve, locking apparatus 10 can be utilized with any actuator that has a top shaft or rising stem that is directly or indirectly connected to a valve stem that moves axially of any type of valve. Valve 14 can be, for example, associated with a wellhead assembly that is disposed over a well (e.g., an oil well). The wellhead assembly can include a wellhead housing, a production tree over the housing and flow lines connected to the tree or the wellhead assembly. The flow lines and wellhead assembly can include embodiments of valve 14 described herein. Valve 14 can also be used for regulating fluids that are designated for entry into the wellhead assembly or for regulating well and other fluids that are otherwise travelling along a pipeline.

Figure 2:
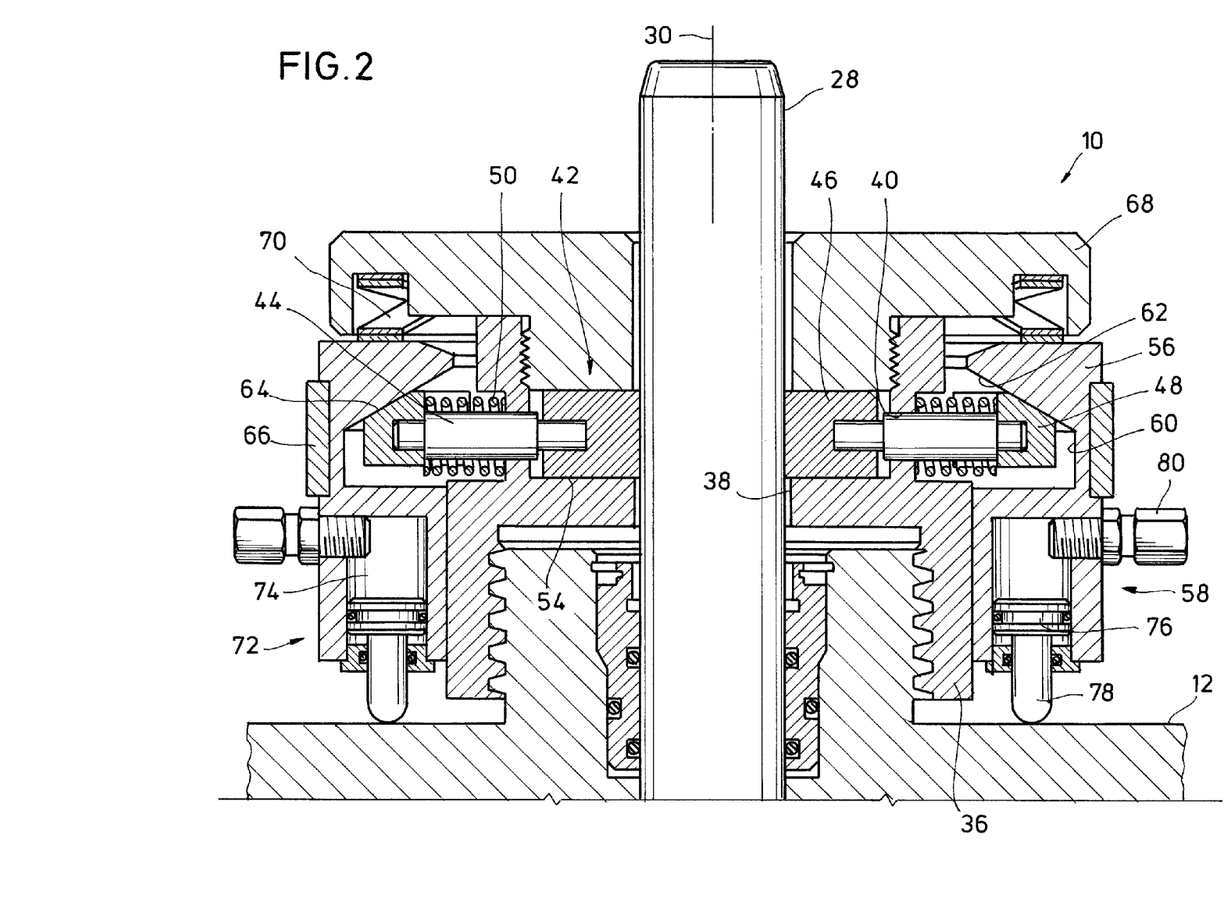
FIG. 2 is a section view of a locking apparatus in accordance with an embodiment of this disclosure, with the actuator stem shown in a retracted position.

Turning to FIG. 2, locking apparatus 10 can be releasably secured to an end of valve actuator 12. Locking apparatus 10 can have assembly body 36. In the example of FIG. 2, assembly body 36 is releasably secured to valve actuator 12 by a threaded connection. Threads on an outer diameter of a portion of valve actuator 12 engage inner diameter threads on a threaded bore of assembly body 36. In alternate embodiment, other connection means known in the art, such as latches or threaded connectors, can be used to releasably secure assembly body 36 to valve actuator 12.

Assembly body 36 is a generally cylindrical member having a central bore. Assembly body 36 includes stem bore 38 for receiving actuator stem 28. Stem bore has a smaller inner diameter than the inner diameter of the other portions of the central bore of assembly body 36. Assembly body 36 also includes plunger orifice 40 that extends through a sidewall of assembly body 36. In an example embodiment, there can be four plunger orifices. In alternate embodiments, there can be one plunger orifice 40 or more than four plunger orifices 40.

Figure 5:
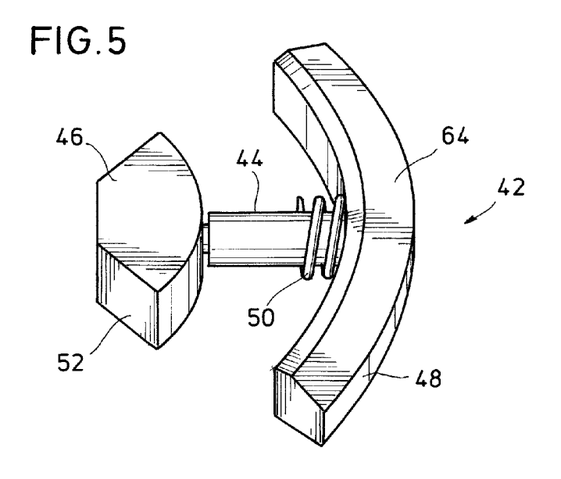
FIG. 5 is a perspective view of an immobilizer assembly in accordance with an embodiment of this disclosure.

Locking apparatus 10 further includes immobilizer assembly 42, elements of which can be seen in FIG. 5. Immobilizer assembly 42 includes plunger 44, locking block 46 at an inner end of plunger 44, profiled end 48 at an outer end of plunger 44, and spring member 50. The inner end of immobilizer assembly 42 therefore can be locking block 46. Locking block 46 can be generally wedge shaped and can be mated with and removed from plunger 44. Profiled end 48 can be a generally arc shaped member that is secured to plunger 44. The number of immobilizer assemblies 42 can be equal to the number of plunger orifices 40 so that a plunger 44 of each immobilizer assembly 42 extends through one of the plunger orifices 40.

Plunger 44 extends through plunger orifice 40 and is moveable between a radially inner position (FIG. 3) where immobilizer assembly 42 extends over stem bore 38, and a radially outer position (FIG. 2) where an inner end of immobilizer assembly 42 is radially outward of stem bore 38. Looking at FIG. 2, the inner end of plunger 44 is on a radially inward side of the sidewall of assembly body 36 and is connected to locking block 46. The outer end of plunger 44 is radially outward of assembly body 36 and connected to profiled end 48.

Figure 3:
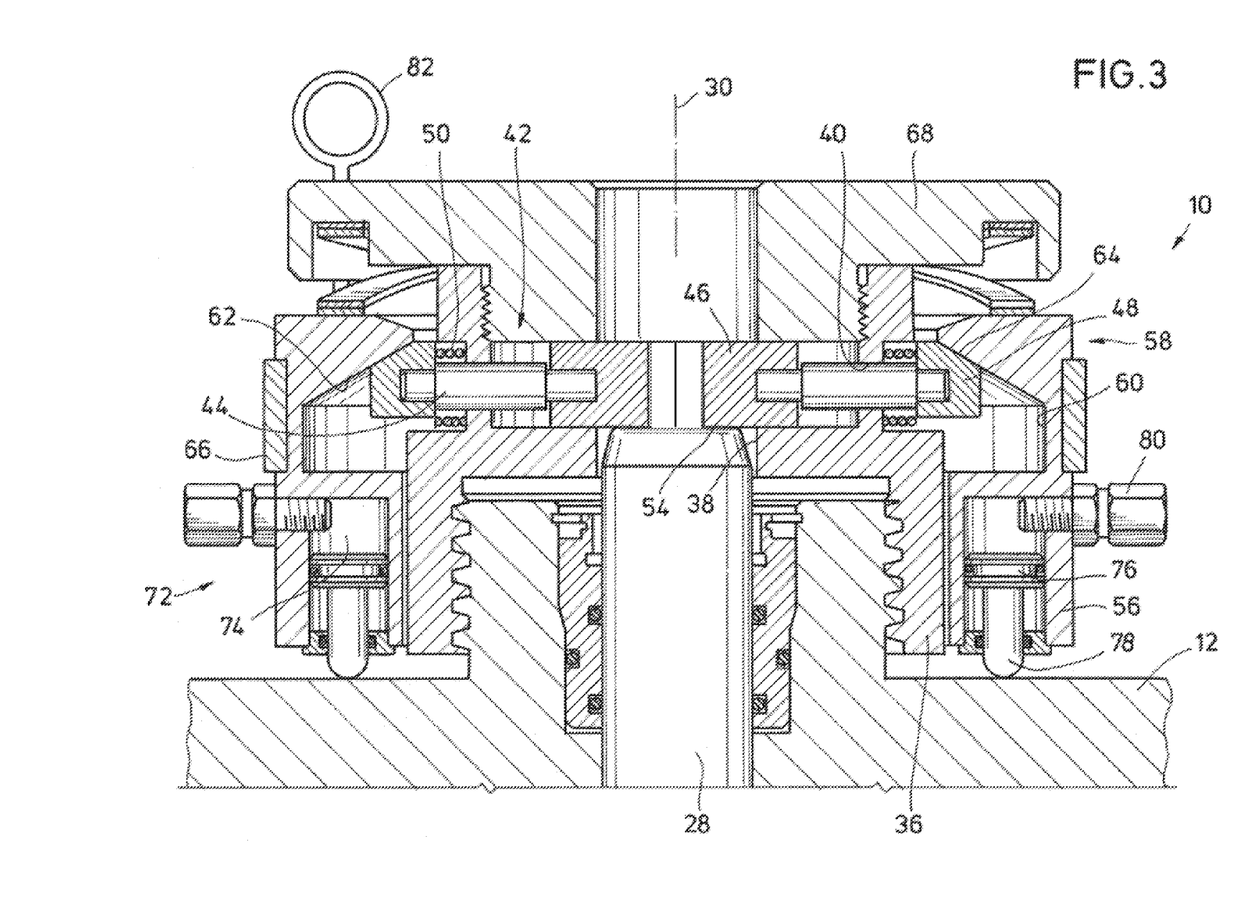
FIG. 3 is a section view of the locking apparatus of FIG. 2, with the actuator stem shown in an extended position and the locking apparatus in a locked position.

As can be seen in FIG. 3, when plunger 44 is in the radially inner position, it is locking block 46 of immobilizer assembly 42 that extends over stem bore 38. Looking at FIG. 2, when plunger 44 is in the radially outer position, it is portion of locking block 46 of immobilizer assembly 42 that is radially outward of stem bore 38. When plunger 44 is in the radially outer position, locking blocks 46 are spaced farther away from the central axis 30 so that a sufficient portion of locking block 46 is radially outward of stem bore 38 to allow actuator stem 28 to extend axially past immobilizer assembly 42. Spring member 50 is located between assembly body 36 and profiled end 48, spring member 50 biases plunger 44 towards the radially outer position.

Looking at FIGS. 3 and 5, when plunger 44 is in the radially inner position, locking blocks 46 have side surfaces 52 that meet around a central axis 30 of locking apparatus 10. In such a position, a lower surface 54 of locking blocks 46 can be located over the top of the end of actuator stem 28, blocking actuator stem 28 from moving axially upward by extending over stem bore 38 and preventing actuator stem 28 from extending past immobilizer assembly 42 and locking valve 14 in a lower position.

Surrounding assembly body 36 are housing segments 56 that form segmented housing 58. Segmented housing 58 circumscribes assembly body 36. Locking apparatus 10 can include two or more housing segments 56 that are arc shaped so that when in an assembled condition as segmented housing 58, segmented housing 58 is generally ring shaped. Housing segments 56 have an inner groove 60 that extends around an inner surface of housing segments 56. Inner groove 60 can have a back wall that is generally parallel to an outer surface of housing segment 56. The back wall extends between a lower surface of inner groove 60 that can be generally perpendicular to the back wall and downward sloped surface 62 that is angled relative to the back wall.

Looking at FIG. 2, downward sloped surface 62 of segmented housing 58 engage an outer end of each immobilizer assembly 42. Profiled end 48 of immobilizer assembly 42 has upward sloped surface 64 that engages downward sloped surface 62 of inner groove 60. The interaction of upward sloped surface 64 and downward sloped surface 62 can transfer an axial movement of segmented housing 58 to a radial movement of immobilizer assembly 42. Segmented housing 58 can move between a first position (FIG. 2) where plunger 44 is in the radially outer position and a second position (FIG. 3) where plunger 44 is in the radially inner position. In the first position, segmented housing 58 is farther away from valve actuator 12 than when segmented housing 58 is in the second position. When segmented housing 58 is in the first position, spring member 50 will push plunger 44 radially outward until upward sloped surface 64 engages downward sloped surface. When segmented housing moves closer to valve actuator 12 to the second position, spring member 50 will continue to push plunger 44 radially outward, but the interaction of upward sloped surface 64 with downward sloped surface will force plunger 44 radially inward.

Housing segments 56 can be supported and held together by fusible band 66. Fusible band 66 can be formed of a fusible material that deteriorates at raised temperatures, such as those that might occur during a fire. The fusible material will be selected so that Fusible band 66 will fail within six minutes at a temperature of at least 1000 degrees Fahrenheit. The fusible material can alternately be selected so that fusible band 66 fails in less than six minutes or at temperatures less than 1000 degrees Fahrenheit. The fusible material can be a thermoplastic or other polymer and can be, for example, a polyoxymethylene such as an acetal homopolymer or Delrin®. Fusible band 66 can circumscribe housing segments 56 and be located in a circumferential groove in an outer surface of housing segments 56. Fusible band selectively retains the housing segments 56 in the assembled condition of segmented housing 58 so that segmented housing 58 remains in engagement with each of the immobilizer assemblies 42.

Locking apparatus 10 further includes cap 68. Cap 68 is a disk shaped member with a central opening for receiving actuator stem 28. Cap 68 is releasably secured to assembly body 36 in a manner that provides an axial space between a top surface of assembly body 36 and a bottom surface of cap 68. As an example, cap 68 can have threads on an outer diameter that mate with inner diameter threads of assembly body 36.

Biasing member 70 is located between, and engages, the top surface of segmented housing 58 and the bottom surface of cap 68, urging segmented housing 58 away from cap 68 and towards the second position. Segmented housing 58 is not axially fixed relative to assembly body 36, but instead can move axially relative to housing segments 56, cap 68, and valve actuator 12, subject to the constraints of immobilizer assembly 42, biasing member 70, and, as will be discussed below the piston assemblies 72.

Piston assemblies 72 include piston cavity 74. In the example embodiment of FIG. 2, there are a number of piston cavities 74 spaced around a bottom surface of housing segment 56. Piston cavities 74 contain piston members 76. Piston members 76 have a leg 78 that extends out of piston cavity 74 and selectively engages the top surface of valve actuator 12. A pressure media port 80 extends from each piston cavity 74 to an outer surface of housing segment 56. Piston member 76 sealingly engages the inner surface of piston cavity 74 so that as pressure media is pumped into pressure media port 80, the pressure media will act on piston member 76 and piston cavity 74 to move segmented housing 58 axially away from valve actuator 12 and towards a first position. Releasing pressure media from piston cavity 74 will allow biasing member 70 to move segmented housing 58 towards the second position.

Figure 6:
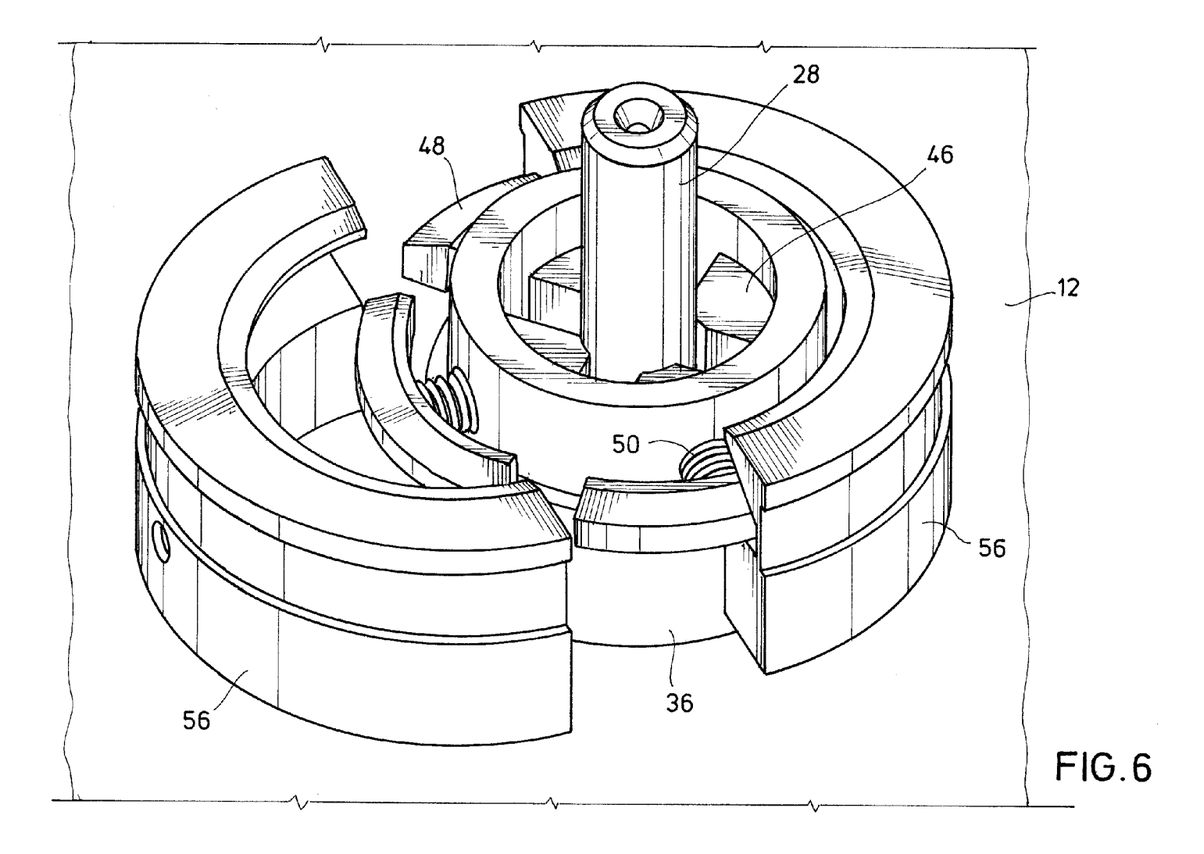
FIG. 6 is a perspective view of a partially assembled locking apparatus in accordance with an embodiment of this disclosure, shown with the segmented housing separated.

Looking at FIGS. 2 and 6, locking apparatus 10 can be releasably secured to valve actuator 12 by threading assembly body 36 onto valve actuator 12. Plunger 44 can be extended through plunger orifice 40 before locking block 46 is attached to plunger 44. Housing segments 56 can then be made up around assembly body 36 to form segmented housing 58. Fusible band 66 can be mounted on segmented housing 58 to hold housing segments 56 in the assembled condition.

Figure 7:
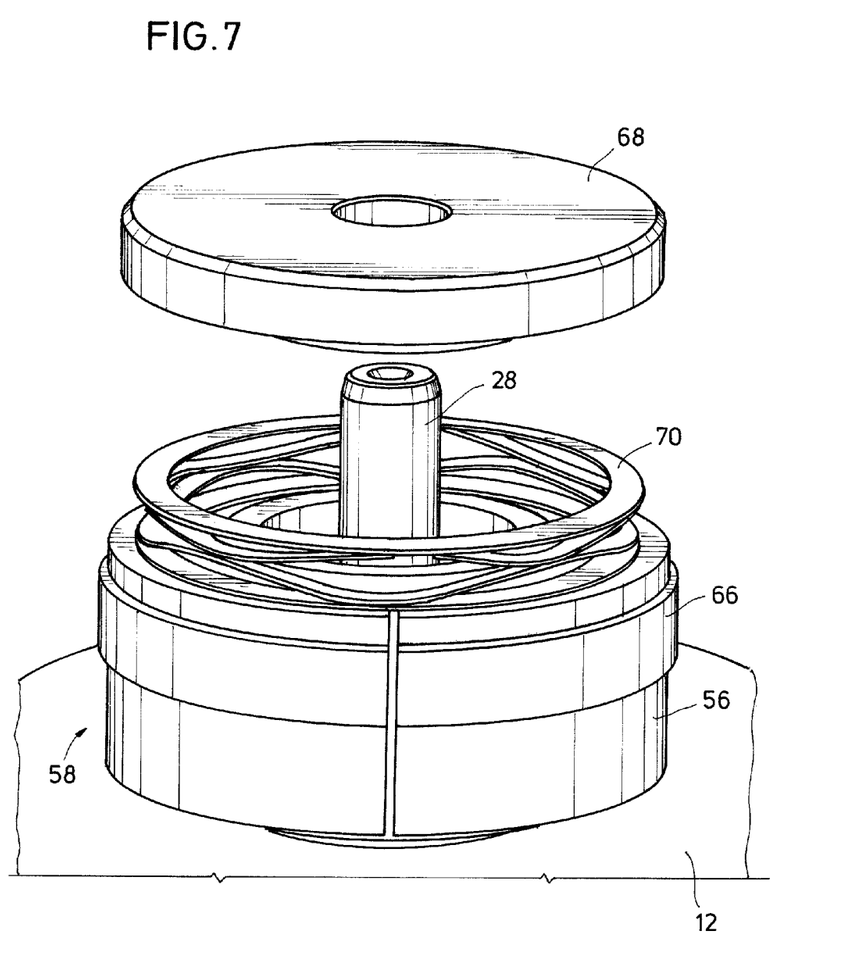
FIG. 7 is a perspective view of a partially assembled locking apparatus in accordance with an embodiment of this disclosure, shown with the cap being lowered onto the biasing member.
Figure 8:
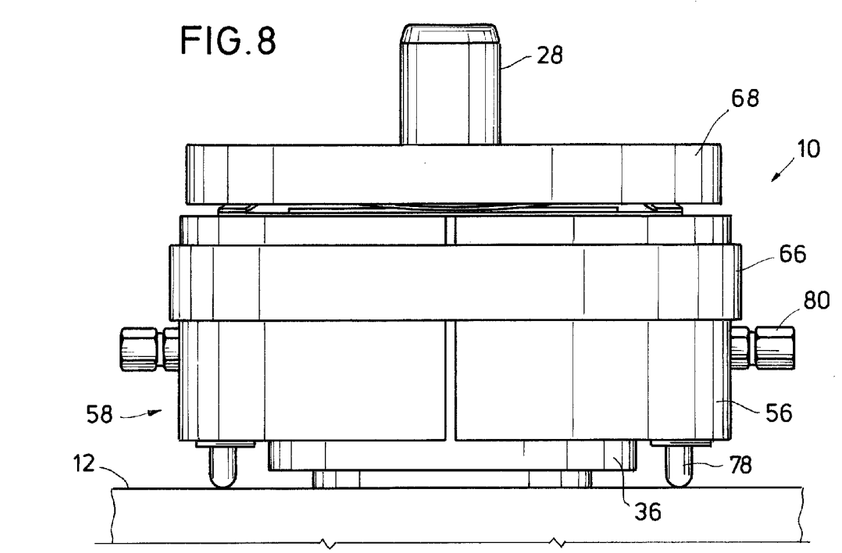
FIG. 8 is a perspective section view of the locking apparatus of FIG. 2.

Looking at FIG. 7, biasing member 70 can then be located on a top surface of segmented housing 58 and cap 68 can be threaded on to assembly body 36, to result in the final assembled locking apparatus 10 of FIG. 8.

In an example of operation, looking at FIG. 2, valve actuator 12 is shown in a retracted position, with actuator stem 28 extending out through cap 68 of locking apparatus 10. An inner surface of locking blocks 46 is located around the outer diameter of actuator stem 28. Biasing member 70 urges segmented housing 58 away from cap 68, resulting in downward sloped surface 62 of assembly body 36 engaging upward sloped surface 64 of profiled end 48. The engagement of downward sloped surface 62 with upward sloped surface 64 translates the axial force of biasing member 70 on segmented housing 58 to a radial force of segmented housing 58 on immobilizer assembly 42, urging the inner surface of locking blocks 46 against the outer diameter of actuator stem 28.

Turning to FIG. 3, as valve actuator 12 moves towards an extended or locked position, the end of actuator stem 28 is lowered below locking blocks 46. After the end of actuator stem 28 clears the bottom of locking blocks 46, the radial force of segmented housing 58 on immobilizer assembly 42 will cause locking blocks 46 to move towards each other and meet around central axis 30. In such a position, a lower surface of locking blocks 46 will be located over the top of the end of actuator stem 28, blocking actuator stem 28 from moving axially upward, and locking the valve actuator 12 in the locked position. Where valve 14 associated with valve actuator 12 is a normal closed valve, this will also lock valve 14 in an open position. Alternately, where valve 14 associated with valve actuator 12 is a normal open valve, this will lock valve 14 in a closed position.

In order to return valve actuator 12 to the retracted position of FIG. 2, either a hydraulic or a manual method can be used. In the hydraulic method, a pressure media, such as hydraulic fluid or pressurized gas, can be injected through pressure media ports 80 and into piston cavities 74. This will cause segmented housing 58 to move upward relative to valve actuator 12 as leg 78 of piston assemblies 72 act on the top surface of valve actuator 12. Upward movement of segmented housing 58 causes spring member 50 to urge profiled end 48 outward and away from assembly body 36 so that locking blocks 46 move radially outward and no long prevent axial upward movement of actuator stem 28. The increase in diameter of inner groove 60 along downward sloped surface 62 provides room for immobilizer assembly 42 to move sufficiently radially outward to allow for actuator stem 28 to move to the retracted position.

Alternately, in a manual method, mechanical handle 82 (FIG. 3) that is attached to segmented housing 58 can be pulled, for example remotely by a chain or rope, in order to move segmented housing 58 upward. Again, upward movement of segmented housing 58, cause spring member 50 to urge profiled end 48 outward and away from assembly body 36 so that locking blocks 46 move radially outward and no longer prevent axial upward movement of actuator stem 28.

Figure 4:
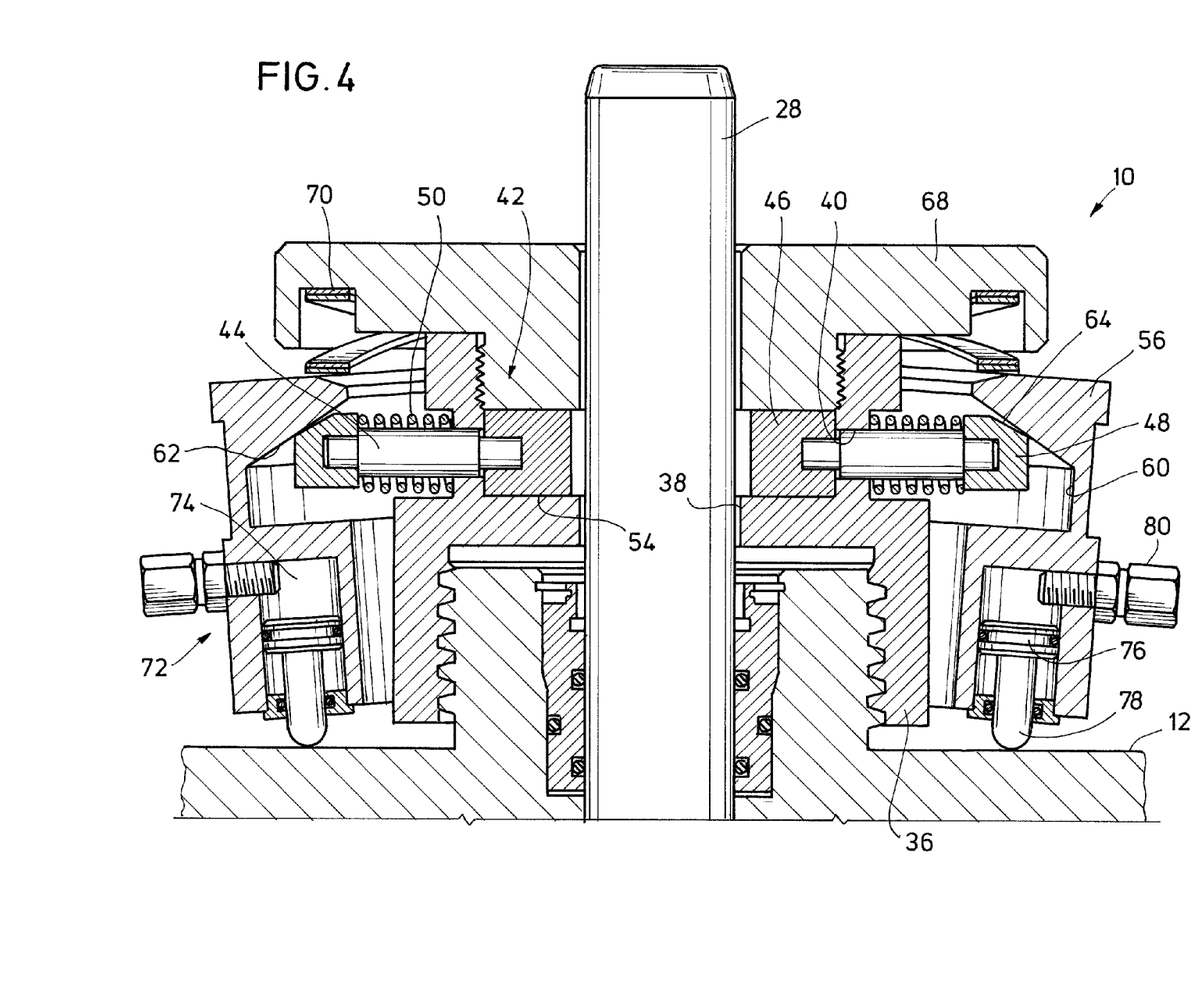
FIG. 4 is a section view of the locking apparatus of FIG. 2, shown without the fusible band and with the actuator stem in a retracted position.

In the case of raised temperatures, such as during a fire, fusible band 66 will deteriorate and fail. Looking at FIG. 4, without fusible band 66 to hold housing segments 56 in place, housing segments 56 will fall away. Spring member 50 will then urge profiled end 48 outward and away from assembly body 36 so that locking blocks 46 move radially outward and no long prevent axial upward movement of actuator stem 28.

In order to reset and reuse locking apparatus 10, housing segments 56 can be located once again around assembly body 36 as shown in FIG. 6. A new fusible band 66 can then be positioned around segmented housing 58, and locking apparatus 10 is ready for use once again.

What is claimed is:

1. A locking apparatus for attaching to an end of a valve actuator, the apparatus comprising:
   an assembly body, the assembly body releasably securable to a valve actuator, the assembly body having a stem bore for receiving an actuator stem, and a plunger orifice through a sidewall of the assembly body;
   an immobilizer assembly having a plunger extending through the plunger orifice, the plunger being biased radially outward and moveable between a radially inner position where the immobilizer assembly extends over the stem bore, and a radially outer position where a portion of an inner end of the immobilizer assembly is radially outward of the stem bore;
   a segmented housing circumscribing the assembly body and moveable between a first position where the plunger is in the radially outer position and a second position where the plunger is in the radially inner position;
   a fusible band selectively retaining the segmented housing in engagement with the immobilizer assembly; and
   a cap releasably secured to the assembly body, and a biasing member engaging the cap and urging the segmented housing towards the second position.

2. The apparatus according to claim 1, wherein the immobilizer assembly includes a locking block at an inner end of the plunger, and a profiled end at an outer end of the plunger.

3. The apparatus according to claim 2, wherein the profiled end has an upward sloped surface that engages a downward sloped surface of the segmented housing.

4. The apparatus according to claim 1, wherein the segmented housing has an inner groove on an inner diameter surface of the segmented housing and wherein an outer end of the immobilizer assembly is located within the inner groove of the segmented housing.

5. The apparatus according to claim 1, further comprising a piston cavity in the segmented housing, and a piston member extending from the piston cavity, the piston member selectively moving the segmented housing between the first position and the second position.

6. The apparatus according to claim 5, wherein an end of the piston member is engagable with a surface of the valve actuator.

7. The apparatus according to claim 1, wherein the segmented housing includes housing segments, the housing segments being arc shaped and forming the segmented housing in a ring shape when the housing segments are retained by the fusible band.

8. The apparatus according to claim 1, wherein:
   the assembly body has a plurality of the plunger orifices;
   the apparatus has a plurality of the immobilizer assemblies, the plunger of each immobilizer assembly extending through one of the plunger orifices.

9. The apparatus according to claim 1, wherein the fusible band is formed of a thermoplastic material.

10. The apparatus according to claim 1, wherein the fusible band is formed of a material that fails in under six minutes at a temperature of at least 1000 degrees Fahrenheit.

11. The apparatus according to claim 1, wherein the fusible band substantially circumscribes the segmented housing.

12. A locking apparatus for attaching to an end of a valve actuator, the apparatus comprising:
   an assembly body, the assembly body releasably securable to a valve actuator, the assembly body having a stem bore for receiving an actuator stem, and a plunger orifice through a sidewall of the assembly body;
   a plurality of immobilizer assemblies spaced circumferentially around the assembly body, each of the plurality of immobilizer assemblies having a plunger extending through the plunger orifice, the plunger being moveable between a radially inner position where a portion of an inner end of each immobilizer assembly extends over the stem bore, and a radially outer position where the portion of the inner end of each immobilizer assembly is radially outward of the stem bore;
   at least two ring shaped housing segments, the housing segments having an assembled condition where the housing segments form a segmented housing that circumscribes the assembly body and engages an outer end of each immobilizer assembly; and
   a fusible band selectively retaining the housing segments in the assembled condition.

13. The apparatus according to claim 12, further comprising a cap releasably secured to the assembly body, and a biasing member located between the cap and the segmented housing biasing the segmented housing towards the valve actuator.

14. The apparatus according to claim 12, wherein the immobilizer assembly includes a locking block at an inner end of the plunger, and a profiled end at an outer end of the plunger, wherein the profiled end has an upward sloped surface that engages a downward sloped surface of the segmented housing.

15. The apparatus according to claim 12, further comprising a piston cavity in the segmented housing, and a piston member extending from the piston cavity to selectively engage the valve actuator to move the segmented housing between a first position where the plunger is in the radially outer position and a second position where the plunger is in the radially inner position.

16. The apparatus according to claim 12, wherein the immobilizer assembly includes a spring member located between the assembly body and a profiled end at an outer end of the plunger, the spring member biasing the plunger towards the radially outer position.

17. The apparatus according to claim 12, wherein the immobilizer assembly includes a locking block at an inner end of the plunger, a lower surface of the locking block blocking the actuator stem from moving axially upward.

18. A method for locking a valve with a locking apparatus attached to an end of a valve actuator, the method comprising:
   (a) providing an assembly body and releasably securing the assembly body to a valve actuator, the assembly body having a stem bore for receiving an actuator stem, and a plunger orifice through a sidewall of the assembly body;
   (b) moving a plunger of an immobilizer assembly through the plunger orifice from a radially outer position where a portion of an inner end of the immobilizer assembly is radially outward of the stem bore, to a radially inner position where the portion of the inner end of the immobilizer assembly extends over the stem bore and prevents the actuator stem from extending past the immobilizer assembly;
   (c) retaining the plunger in the radially inner position with a segmented housing that circumscribes the assembly body;
   (d) biasing the segmented housing in a second position where the plunger is in the radially outer position, with a biasing member located between a cap that is releasably secured to the assembly body and the segmented housing; and
   (e) retaining the segmented housing in engagement with the immobilizer assembly with a fusible band.

19. The method according to claim 18, wherein the step of moving the plunger includes moving the segmented housing between a first position where the plunger is in the radially outer position and a second position where the plunger is in the radially inner position.

20. The method according to claim 18, further comprising the step of moving the plunger of the immobilizer assembly through the plunger orifice from the radially inner position to the radially outer position by injecting a pressure media into a piston cavity in the segmented housing to move a piston member that extends from the piston cavity and push the segmented housing to a first position where the plunger is in the radially outer position.

21. The method according to claim 18, further comprising, after the fusible band has deteriorated and the plunger has moved to the radially outer position, repeating steps (b)-(d) to relock the valve.

* * * * *